US010521390B2

(12) United States Patent
Linderman et al.

(10) Patent No.: US 10,521,390 B2
(45) Date of Patent: Dec. 31, 2019

(54) SYSTEMS AND METHOD FOR MAPPING FIFOS TO PROCESSOR ADDRESS SPACE

(71) Applicant: GOVERMENT OF THE UNITED STATES AS REPRESENTED BY SECRETARY OF THE AIR FORCE, Rome, NY (US)

(72) Inventors: Mark H Linderman, Rome, NY (US); Qing Wu, Manlius, NY (US); Dennis Fitzgerald, Sauquoit, NY (US)

(73) Assignee: The United States of America as represented by the Secretary of the Air Force, Washington, DC (US)

( * ) Notice: Subject to any disclaimer, the term of this patent is extended or adjusted under 35 U.S.C. 154(b) by 123 days.

(21) Appl. No.: 15/804,525

(22) Filed: Nov. 6, 2017

(65) Prior Publication Data
US 2018/0137075 A1 May 17, 2018

Related U.S. Application Data

(60) Provisional application No. 62/423,214, filed on Nov. 17, 2016.

(51) Int. Cl.
  *G06F 13/40* (2006.01)
(52) U.S. Cl.
  CPC ........ *G06F 13/404* (2013.01); *G06F 13/4022* (2013.01); *G06F 13/4031* (2013.01); *G06F 13/4081* (2013.01)

(58) Field of Classification Search
  CPC . G06F 3/0656; G06F 5/06; G06F 5/08; G06F 5/10; G06F 5/12; G06F 5/14; G06F 13/4022; G06F 13/4031; G06F 13/404; G06F 13/4081
  See application file for complete search history.

(56) References Cited

U.S. PATENT DOCUMENTS

| 7,003,638 | B2 * | 2/2006 | Brant | G06F 13/404 345/531 |
| 7,181,563 | B2 * | 2/2007 | Andreev | G06F 5/16 711/150 |

* cited by examiner

*Primary Examiner* — Idriss N Alrobaye
*Assistant Examiner* — Richard B Franklin
(74) *Attorney, Agent, or Firm* — Joseph A. Mancini

(57) ABSTRACT

An apparatus for a microprocessor computer system and method for configuring the same where said microprocessor computer system comprises a processor core and at least one hardware buffer FIFO with memory-mapped head and tail that handles data movement among the processor cores, networks, raw data input and outputs, and memory. The method for configuring said microprocessor computer system comprises utilizing a FIFO auxiliary processor to process said data traversing said hardware FIFO; utilizing said hardware FIFOs to efficiently pipe data through functional blocks; and utilizing a FIFO controller to perform DMA operations that include non-unit-stride access patterns and transfers among processor cores, networks, raw data input and outputs, memory, and other memory-mapped hardware FIFOs.

28 Claims, 9 Drawing Sheets

SYSTEMS AND METHOD FOR MAPPING FIFOS TO PROCESSOR ADDRESS SPACE

CROSS REFERENCE TO RELATED APPLICATIONS

This application claims the benefit under 35 U.S.C. § 119(e) of U.S. Provisional Patent Application Ser. No. 62/423,214 filed on Nov. 17, 2016 and titled Mapping FIFOs In Processor Address Space, the entire content of which is incorporated herein by reference.

GOVERNMENT INTEREST

The invention described herein may be manufactured and used by or for the Government of the United States for all governmental purposes without the payment of any royalty.

FIELD OF THE INVENTION

The present invention relates to the architecture and operation of a microprocessor computer system. More specifically, this invention pertains to devices, systems, and methods for rapid processing of data using buffering in a microprocessor computer system.

BACKGROUND OF THE INVENTION

In the fields of computer science and computing system architecture, FIFO is an acronym for "first in, first out," which is a common method for organizing and manipulating a data buffer as a queue. In a FIFO implementation, processing of data structures that are input to a data buffer is analogous to servicing a queue on a first-come, first-served (FCFS) basis. That is, the oldest (first) entry into a FIFO buffer is processed first. Communication network bridges, switches, and routers used in computer networks may employ FIFO buffers to temporarily store data structures (referred to as "data packets") as they await service from limited processing resources that are tasked with facilitating progress of the data packets through a computing architecture. In common computer network architectures, one or more FIFO buffers may be dedicated to service a single network connection. Also, multiple FIFOs may be designed to simultaneously and independently queue different types of information (e.g., data type-specific buffers).

Depending on the application, a FIFO may be implemented as a hardware shift register(s) or in software in a memory structure. The ends of a FIFO queue are often referred to as a head and a tail. As used herein, data structures enter a queue at the tail, and remain in the queue until they reach the head (from which the data structure leaves the queue). That is, the data structure at head of the queue is processed before subsequently-queued data structures.

A FIFO is commonly implemented as a circular queue characterized by two pointers: a Read Pointer/Read Address Register, and a Write Pointer/Write Address Register. In such a buffer implementation, read and write addresses are initially both at a first memory location and the FIFO queue is said to have a state of Empty. When the read address register reaches the write address register, the FIFO may trigger an Empty signal and stall subsequent read requests until data is available. When the write address register reaches the read address register, the FIFO is said to have a state of Full and the FIFO may trigger a Full signal and stall subsequent write requests until space is available.

As related above, microprocessors commonly employ queues to buffer traffic going to or coming from a network. The Air Force Research Laboratory (AFRL) Secure Processor version 2 (SPv2), for example, currently employs incoming and outgoing FIFO buffers for traffic coming from/to a crossbar network switch. Future chip designs may employ additional FIFO buffers to external Analog-to-Digital (A/D) and Digital-to-Analog (D/A) converters. Data from such devices are expected to come at high data rates with minimal framing. Transmitting and consuming/generating such data efficiently poses an architectural challenge.

In some computing system implementations, handling network traffic can tie up the available processor(s) as packets of data are processed. If incoming data packets are sent to the cache to then be written to memory and, eventually, recalled into cache and processed, this may result in significant latency penalties for memory access and susceptibility to pollution of the cache. These latencies, combined with network congestion and overhead of handling network protocols, can result in delays within the data pipeline and can lead to dropped data and/or corrupted data streams. A need exists for a more efficient means to handle queued data packets characterized by high data rates.

This background information is provided to reveal information believed by the applicant to be of possible relevance to the present invention. No admission is necessarily intended, nor should be construed, that any of the preceding information constitutes prior art against the present invention.

SUMMARY OF THE INVENTION

With the above in mind, embodiments of the present invention are directed to systems, methods, and devices for high-data rate computation using first in-first out (FIFO) queues and control mechanisms in embedded, microprocessor, and/or multiprocessor computer systems. Embodiments of the present invention may employ a small state machine or microcontroller to advantageously convert a simple FIFO mechanism into a powerful tool to map data into memory, transform data representation, and/or to forward data across a distributed computing architecture. The FIFO abstraction and the mapping into simple processor instructions also may advantageously allow low-power processors to more efficiently manipulate incoming and outgoing data.

The technique described herein may include mapping the head and/or tail of a FIFO into the address space of a host processor (as opposed to a dedicated internal register) by taking advantage of the fact that a FIFO has a single head and tail regardless of the depth of the FIFO. In one embodiment of the present invention, the address of the FIFO head and the address of the FIFO tail may be the same with the operating assumption that a write to that address is enqueuing data at the tail of the queue and that a read is dequeuing data from the head of the queue. In another embodiment of the present invention, the address of the FIFO head and the address of the FIFO tail are different. In both embodiments, a key feature of the present invention is that unlike common software queue implementations, the addresses of the head and tail of the queue do not change as data is enqueued and dequeued and management of the queue is off-loaded from the processor core to hardware or a FIFO controller. In one embodiment of the present invention, consistent with a FIFO data structure, only the head and tail of the queue are addressable, and their physical address values have no bearing on the depth of the underlying queue. The key attributes of the present invention are that the FIFOs are implemented in hardware and that at least one of the tail and head of the FIFO are memory mapped to addresses through which a processor core may write and read data, respectively. The hardware memory-mapped FIFO may be referred to as a "hardware FIFO," "memory-mapped FIFO," and "FIFO" hereinafter with the understanding that they refer to the same thing. The different terminology is used to highlight different attributes of the present invention. It is further understood that said core processor may include any number of lower-level caches that interact with said memory-mapped FIFOs on behalf of the core processor.

A processor core may interact with such a memory-mapped FIFO using existing cache control signals to handle exceptions arising from an empty or full FIFO. In one embodiment of the present invention, the FIFO is architecturally combined with the cache. In another embodiment of the present invention, the FIFO is architecturally distinct from the cache but shares a common interface to the processor core and/or memory with the cache. In yet another embodiment, there is no cache, but there are FIFOs that are controlled by the processor core. In both cases, the effect is that the FIFO is accessed by the processor core as an address just as any other address is accessed through the cache or other memory external to the processor core. For a process on the processor core to consume a value from the FIFO, the process may simply read (fetch) the memory address, which may have the effect of dequeuing the value at the head of the queue and returning that value to the processor core. Unlike a traditional cache miss that results in data being retrieved from higher in the memory hierarchy, the present invention may advantageously use the existing cache control signals that indicate a cache miss to indicate that the FIFO is waiting for another value to be enqueued. In the case of writing (enqueuing) onto the FIFO, the processor core may simply write a value to the FIFO memory-mapped address. In the event that the FIFO is full, one embodiment of the present invention may again treat the write as a cache miss and stall the processor core or the requesting thread.

Another embodiment of the present invention may comprise a hardware implementation of a FIFO buffer of fixed depth implemented by computer memory types such as latches, flip-flops, shift registers, circular register array, and static RAM (SRAM). Yet another embodiment of the present invention may comprise a hardware FIFO backed by memory higher in the memory hierarchy (e.g., SRAM, dynamic RAM (DRAM) or flash-based solid state drive (SSD)) which may be configured to expand the capacity of an underlying hardware FIFO buffer. In yet another embodiment of the present invention, a dedicated additional buffer memory may be employed to expand buffer capacity without interfering with operation of the processor core and the cache. Data from the FIFO may intermittently be transferred to said higher-level memory and said additional buffer memory to avoid filling the FIFO. Similarly, data may intermittently be transferred from said higher-level memory and said additional buffer memory to the FIFO buffer to ensure that it does not go empty. In either case, transferring larger blocks of data may increase the efficiency of transferring data to and from higher-level memory and the FIFO buffer over embodiments that perform finer-granularity transfers.

More specifically, an embodiment of the present invention may include a microprocessor computer system comprising at least one memory-mapped hardware FIFO and a cache memory. Each hardware FIFO may be characterized by a buffer head and/or a buffer tail. Each hardware buffer also may be of computer memory type such as static random-access memory (SRAM), flip-flops, and latches, and also may be of one of the following service types: incoming raw input/output (I/O), outgoing raw I/O, incoming network, and outgoing network. The memory-mapped FIFOs each may be characterized by a mapped head and/or a mapped tail. In one embodiment of the present invention, memory-mapped FIFOs may be pinned to logical buffer address managed by the cache memory. For example, a four-way associative cache may be extended to a five way cache, where the addresses of the FIFOs are always mapped to the fifth way and those addresses are never evicted from the cache and no other addresses are mapped to that way of the cache.

An embodiment of the current invention may comprise a FIFO an interface to transfer data value from the FIFO head with at least one of the processor core, the cache, higher-level memory, raw outputs, a network, and another FIFO tail and an interface to transfer data value to the FIFO tail from at least one of the processor core, the cache, higher-level memory, raw outputs, a network, and another FIFO head.

An embodiment of the present invention may comprise a synchronous FIFO when all data transfers to the head and tail occur synchronously with respect to a common reference clock. Another embodiment of the present invention may comprise an asynchronous FIFO when at least two sources of data transfers involving at least one of the head and tail of the FIFO do not share a common reference clock. This embodiment may be appropriate for external raw input that is strobed independently from the processor clock. A further embodiment of the present invention may combine at least one synchronous FIFO and at least one asynchronous FIFO.

An embodiment of the present invention comprises a plurality of FIFOs, called a FIFO bank, that are operably coupled to differing combinations of the processor core, the cache, higher-level memory, raw outputs, a network, and another FIFO from their respective heads and tails. The FIFOs within the bank may share data and address busses and control signals across the FIFO bank and may further share data and address busses and control signals with at least one of the processor core, cache memory, raw inputs, raw outputs, network inputs, and network outputs. A further embodiment of the present invention uses arbiters to manage combining of inputs from a plurality of sources to provide a single input to at least one of the processor core, cache memory, and higher-level memory.

An embodiment of the present invention may comprise a FIFO bank and a FIFO arbiter that segments and controls exchanges among at least two of the processor core, the cache memory, a FIFO, and a FIFO bank. Said FIFO arbiter may ensure that conflicting requests for shared resources do not interfere with one another and may further ensure that all signaling values and timing requirements met. Said FIFO arbiter may also logically combine control signals from a plurality of sources from at least one of the processor core, the cache memory, a FIFO, and a FIFO bank into a single output that is used by at least one of the processor core, the cache memory, a FIFO, and a FIFO bank.

An embodiment of the present invention may further comprise a FIFO controller and FIFO buffer. Said FIFO controller minimally regulates movement of data into and out of the FIFO. It responds to requests to enqueue (write) data from at least one of the processor core, cache, higher-level memory, the network, raw inputs, and other FIFOs. Additionally, said FIFO controller may automate movement of data from head of the FIFO to at least one of the processor core, cache, higher-level memory, the network, raw outputs, and other FIFOs. The FIFO Controller may also execute operations independently from the processor core by reading and writing configuration and status registers that may be configured by the processor core and read by the processor core to inspect elements of the FIFO state. In one embodiment of the present invention, such operations are defined in hardware and parameterized by configuration registers similar to a state machine. In another embodiment of the present invention, the FIFO controller may be a microcontroller execution software stored in its local memory. In yet another embodiment of the present invention, the FIFO controller may be a microcontroller execution software stored in its configuration and status registers.

One such FIFO controller operation direct memory access (DMA) wherein the FIFO, once configured by the processor core, can automatically forward incoming data to memory. Another DMA embodiment of the present invention uses the FIFO controller to fetch data from memory and enqueue it on the FIFO. Yet another embodiment of the present invention may interpret header information on incoming data packets to determine where the packet should be forwarded and then automatically forward the packet data appropriately.

The FIFO controller may further comprise an auxiliary processor (e.g., a field-programmable gate array (FPGA), a microprocessor, or a microcontroller) configured to perform data manipulations upon data in the FIFO. Typically, and without limitation, said processing will occur at the head or tail of the FIFO. An example of said data processing, without limitation, is translating a 16-bit integer data representation to a single-precision float-point number representation. An example, without limitation, of processing that manipulate positions within the queue is implementation of a priority queue. One form of processing, described above, is data movement to and from other storage. All of these forms of processing, without limitation, may be combined arbitrarily based upon the configuration of the FIFO controller.

Another such FIFO controller operation is non-unit-stride direct memory access (DMA) memory write wherein the FIFO, once configured by the processor core, can automatically forward incoming data to memory where sequential data elements are not written to sequential memory locations. The simplest example is writing each subsequent data value to a location at a fixed offset from the previous location. In this way, a dense matrix represented in row-major order can be transposed in memory to one that is column-major order. A generalization of this operation is where each write operation location is programmatically determined by the FIFO controller using any user-defined algorithm.

Another such FIFO controller operation is non-unit-stride direct memory access (DMA) memory read wherein the FIFO, once configured by the processor core, can automatically enqueue data read from non-sequential memory locations. The simplest example is reading each subsequent data value to a location at a fixed offset from the previous location, similar to the matrix corner turn described above. A generalization of this operation is where each write operation location is programmatically determined by the FIFO controller using any user-defined algorithm.

Unlike a traditional memory read (fetch) operation, the FIFO read may comprise four distinct operations: a blocking dequeuing read, a blocking non-dequeuing read, a non-blocking dequeuing read, and a non-blocking dequeuing read. A blocking dequeuing read will remove the data at the head of the FIFO if the FIFO is not empty, otherwise it will block the requesting process or thread. A blocking non-dequeuing read will, if the FIFO is not empty, return the value of the data at the head of the FIFO but will not dequeue it. If the FIFO is empty, it will block the requesting process or thread. A non-blocking dequeuing read will remove the data at the head of the FIFO if the FIFO is not empty, otherwise it will return or signal an invalid value. A non-blocking non-dequeuing read will, if the FIFO is not empty, return the value of the data at the head of the FIFO but will not dequeue it. If the FIFO is empty, it will return or signal an invalid value. The non-blocking reads will not block (or stall) the processor core. In one embodiment of the present invention, the processor core may use additional control signals to indicate the desired operation. In another embodiment of the present invention, the head of the FIFO may have multiple addresses, one for each supported variant of the read operation. This embodiment allows an existing processor core design to implement all supported modes of the read operation without modification of the processor core architecture.

Unlike a traditional memory write operation, the FIFO write may comprise three distinct operations: a blocking enqueuing write, a non-blocking enqueuing write, and a non-enqueuing write. A blocking enqueuing write will enqueue the data at the tail of the FIFO if the FIFO is not full, otherwise it will block the requesting process or thread. A non-blocking enqueuing write will add the data at the tail of the FIFO if the FIFO is not full, otherwise it will signal an invalid operation. A non-enqueuing write will overwrite some or all data currently in the tail of the FIFO but not push it towards the head of the FIFO. In one embodiment of the present invention, the processor core may use additional control signals to indicate the desired operation. In another embodiment of the present invention, the tail of the FIFO may have multiple addresses, one for each supported variant of the write operation. This embodiment allows an existing processor core design to implement all supported modes of the write operation without modification of the processor core architecture.

The FIFO block read operation may comprise three block-oriented data retrieval operations wherein several data elements are retrieved in a single operation. The first operation is a Drain operation that returns data values in turn until the FIFO is empty. The second operation is a blocking fixed-length block read that reads a specified number of data values from the FIFO, blocking if the FIFO goes empty before the last data value is retrieved. The third operation is the non-blocking fixed-length block read operation that reads a specified number of data values from the FIFO, signaling an invalid operation if the FIFO goes empty before the last data value is retrieved.

The FIFO block write operation may comprise three block-oriented data write operations wherein several data elements are pushed onto the FIFO queue in a single operation. The first operation is a Fill operation that stores (enqueues) data values in turn until the FIFO is full. The second operation is a blocking fixed-length block write that writes a specified number of data values to the FIFO, blocking if the FIFO goes full before the last data value is written. The third operation is the non-blocking fixed-length block write operation that writes a specified number of data values from the FIFO, signaling an invalid operation if the FIFO goes full before the last data value is written.

The hardware buffer FIFOs may be contiguous such that FIFO heads, FIFO tails, and all sequential buffer entries there between may be co-located. Additional, non-collocated buffer memory may extend the capacity of the FIFO under control of the FIFO controller.

In one embodiment of the present invention, a FIFO controller may arbitrarily read from memory addresses and write to memory addresses, and FIFOs are memory-mapped to said addresses. This allows said FIFO controllers to move data among FIFOs by reading from one and writing to another. For example, and without limitation, a FIFO controller may dequeue the data value at its FIFO head and write it to the tail of a second memory-mapped FIFO; it may read a value from another FIFO head in enqueue it at its tail; it may even move data between to different FIFOs.

Another embodiment of the present invention comprises at least two memory-mapped FIFOs where the locations for each FIFO tail is known or computable. This embodiment permits the distribution of a sequence of data values to "fan out" to disparate FIFOs by writing (enqueuing) blocks of data to different FIFO tails. If said FIFOs correspond to network buffers, the data may thus be fanned out across the network to achieve load balancing or some other desirable function. A further embodiment of the present invention further includes a FIFO that controls the data distribution and is the source of the distributed data. Another further embodiment of the present invention further includes a processor that controls the data distribution and is the source of the distributed data.

Another embodiment of the present invention comprises at least two memory-mapped FIFOs where the locations for each FIFO head is known or computable. This embodiment permits the gathering of a sequence of data values to "fan in" from disparate FIFOs by reading (dequeuing) blocks of data from different FIFO tails. If said FIFOs correspond to network buffers, the data may thus be fanned in from across the network to achieve load balancing or some other desirable function. A further embodiment of the present invention further includes a FIFO that controls the data gathering and is the destination of the gathered data. Another further embodiment of the present invention further includes a processor that controls the data gathering and is the destination of the distributed data.

A method aspect of the present invention may dynamically configure a microprocessor computer system comprising at least one of a hardware buffer first in first out queue (FIFO) characterized by at least one of a buffer head and a buffer tail and a cache memory comprising a memory-mapped FIFO configured in data communication with the hardware buffer FIFO, wherein the memory-mapped FIFO is characterized by at least one of a mapped head and a mapped tail, a FIFO controller comprising at least one of a state machine and a microcontroller, and a processor core operably coupled to the FIFO controller and logically coupled to the hardware buffer FIFO and to the cache memory via at least one FIFO bus. The method may comprise the steps of detecting an incoming data packet to the hardware buffer FIFO; receiving an interrupt of the processor core based on detection of the incoming packet; fetching to the processor core a frame header for the incoming packet to the hardware buffer FIFO; creating, using the processor core, a direct memory access (DMA) control structure comprising a logical buffer address and a logical buffer size limit based on the frame header for the incoming data packet; and creating in the cache memory a memory-mapped FIFO configured in data communication with the hardware buffer FIFO, wherein the memory-mapped FIFO is characterized by at least one of a mapped head and a mapped tail that is operably controlled by the DMA control structure. The method may further comprise executing, using the cache controller, a memory write operation of a subset of the incoming data packet to at least one of the mapped tail and the mapped head of the memory-mapped FIFO.

DETAILED DESCRIPTION OF THE INVENTION

Figure 1:
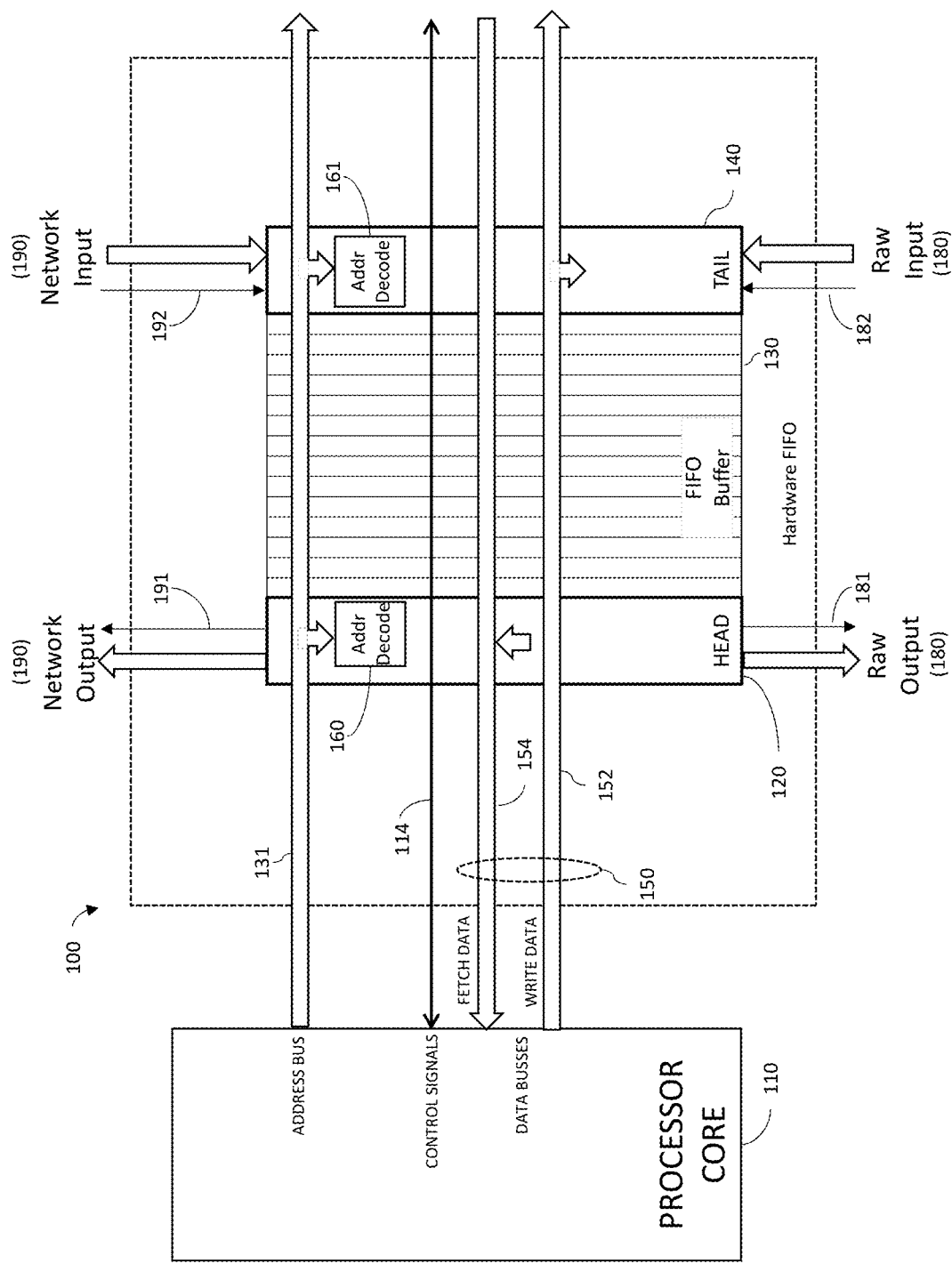
FIG. 1 is a schematic block diagram of an exemplary microprocessor computer system employing a processor core and a memory-mapped hardware First In, First Out (FIFO) buffer architecture according to an embodiment of the present invention.

The present invention will now be described more fully hereinafter with reference to the accompanying drawings, in which preferred embodiments of the invention are shown. This invention may, however, be embodied in many different forms and should not be construed as limited to the embodiments set forth herein. Rather, these embodiments are provided so that this disclosure will be thorough and complete, and will fully convey the scope of the invention to those skilled in the art. Those of ordinary skill in the art realize that the following descriptions of the embodiments of the present invention are illustrative and are not intended to be limiting in any way. Other embodiments of the present invention will readily suggest themselves to such skilled persons having the benefit of this disclosure. Like numbers refer to like elements throughout.

In this detailed description of the present invention, a person skilled in the art should note that directional terms, such as "above," "below," "upper," "lower," and other like terms are used for the convenience of the reader in reference to the drawings. Also, a person skilled in the art should notice this description may contain other terminology to convey position, orientation, and direction without departing from the principles of the present invention.

Furthermore, in this detailed description, a person skilled in the art should note that quantitative qualifying terms such as "generally," "substantially," "mostly," and other terms are used, in general, to mean that the referred to object, characteristic, or quality constitutes a majority of the subject of the reference. The meaning of any of these terms is dependent upon the context within which it is used, and the meaning may be expressly modified.

Referring to FIGS. 1-9, a memory-mapped FIFO architecture for use with a microprocessor and multiprocessor computer system, and associated methods, according to certain embodiments of the present invention are now described in detail. Throughout this disclosure, the present invention may be referred to as a memory-mapped FIFO system, a memory-mapped FIFO device, a memory-mapped FIFO, a FIFO system, a hardware FIFO, a FIFO device, a FIFO method, a FIFO, a device, a system, and a method. Those skilled in the art will appreciate that this terminology is only illustrative and does not affect the scope of the invention.

Certain embodiments of the invention, as shown and described by the various figures and accompanying text, may overcome the problems in the art described above by delivering the following advantages, as described in more detail herein below:

1) Consumes/generates/moves data efficiently at high data rates characteristic of network switches and converters (e.g., analog-to-digital, digital-to-analog)

2) Efficiently operates available buffers to mitigate latency penalties for memory access and avoids undesirable results of clogging of the queued data pipeline (e.g., dropped data, corrupted data streams)

Referring now to FIGS. 1 through 9, the following features of the present invention may contribute to providing the advantages listed above:

A) Hardware FIFO(s) 100 that efficiently enqueues data on behalf of a processor core 110.

B) Controllable FIFO(s) 200 capable of processing data while the processor core performs other activities.

C) Hardware FIFO bank(s) 300 comprising at least one of at least one hardware memory-mapped FIFO(s) 100 and at least one of controllable hardware memory-mapped FIFO(s) 200.

D) Hardware FIFO(s) 100 backed by expandable buffer space in at least one of cache memory 440, higher-level memory 450, and additional buffer memory 510.

E) Processor core(s) 110 operably coupled with at least one of hardware FIFOs (100) and FIFO banks(s) 300 and cache memory 440 via shared busses 131 and 150 and shared control signals 114.

F) Processor core(s) 110 operably coupled with at least one of hardware FIFOs 100 and FIFO banks(s) 300, cache memory 440, and higher-level memory 450 through arbiters that mediate resource contention.

G) Automating data processing by a controllable FIFO based upon processor configuration. Illustration of Direct Memory Access (DMA) setup and operation as a specific example data processing comprising data movement using FIFO control structures (e.g., FIG. 8) and FIFO Controller 250.

E) Solution space-specific configurations of a DMA-based microprocessor computer system, including split FIFOs (FIG. 4), chained FIFOs, split FIFO streams, and merged FIFO streams F) Auxiliary processor(s) for data-dependent pre- and post-processing, including addition of a modulus to the non-unit-stride output of a hardware FIFO(s) and/or a memory-mapped FIFO(s).

Memory-Mapped First-In First-Out (FIFO) Queue

Referring more specifically to FIG. 1, the hardware FIFO 100 according to an embodiment of the present invention will now be discussed. The hardware FIFO 100 may comprise a head 120, a tail 140, and a FIFO buffer 130. The hardware FIFO head 120 may be operably coupled with at least one of the data bus to fetch data 154, a raw output port 180, and a network output port 190. Similarly, the hardware FIFO 140 tail may be operably coupled with at least one the data bus to write data 152, a raw input port 180, and a network input port 190. An address decoder 160 for the head 120 detects if a memory operation affects the FIFO head 120. An address decoder 161 for the tail 140 detects if the memory operation affects the FIFO tail 140. The hardware FIFO may be configured to support enqueuing and dequeuing operations either synchronously or asynchronously. Said enqueuing operations from network 190 or raw inputs 180 are strobed by means of control signals 192 and 182 respectively, indicating valid data is available on the appropriate port. Similarly, said dequeuing operations to network or raw outputs are strobed by means of a control signal 191 and 181, respectively, indicating valid data is available on the appropriate port.

As described above, because a hardware FIFO bank 100 is characterized by a single head 120 and tail 140, such a FIFO 100 may be mapped to a single physical address of the processor core 110 or a virtual address of a process running on said processor core. One embodiment of the present invention may employ one address for the head 120 of the FIFO 100 and another address for the tail 140. An alternative embodiment of the present invention may use a single address for both head 120 and tail 140, but may recognize the logical distinction that a write to that address is enqueuing data at the tail 140 and a read is dequeuing data from the head 120 of the queue. Mapping a FIFO 100 into the address space of the processor core 110, as opposed to a dedicated internal register, is an advantage of the present invention.

The FIFO buffer 130 provides storage for data enqueued at the FIFO tail that has not yet arrived at the FIFO head and may comprise any of several storage selected from the group consisting of a static random-access memory (SRAM), a flip-flop, a register file, and a latch. In one embodiment of the present invention, the depth of the FIFO buffer 130 is fixed.

When writing (enqueuing) on the memory-mapped FIFO 100, the processor core 110 may simply write a value to the FIFO tail memory-mapped address. For example, and without limitation, this WRITE action may enqueue the value on the memory-mapped FIFO. When the memory-mapped FIFO is full, one embodiment of the present invention may be configured to treat the write as a cache miss and operate to stall the processor core 110 or the requesting process or thread. However, an alternative embodiment may be to operate to allow a write to fail.

A hardware FIFO 100 may be mapped to a memory location in the physical address space of the processor core 110. Additionally, said hardware FIFO 100 may be mapped into the virtual address space of one or more processes executing on the processor core.

In one embodiment of the present invention, each hardware FIFO 100 may present either its head 120 or its tail 140 to the processor core 110 if its tail is written to or its head is read from, respectively, at least one of the Network 190, Raw I/O 180, other storage, and other FIFOs 100. For example, and incoming Raw data input from an external analog-to-digital converter may asynchronously strobe data into the FIFO tail and this may be the only means of enqueuing data on the FIFO, whereas the processor may read (dequeue) data from the head of the processor using a typical LOAD operation. Alternatively, or in addition, the present invention may be configured such that both ends 120, 140 of the FIFO 100 may be exposed to the processor core 110 for tasks such as inter-thread or inter-process communication.

How the processor core 110 may interact with a memory-mapped FIFO 100 will now be described in detail. In one embodiment, the present invention may include architecturally treating the FIFO similar to a cache memory as commonly understood to those skilled in the art. Such architectural mapping may advantageously support use of the existing cache control signals 114 to handle exceptions such as an empty or full FIFO. For example, and without limitation, when implementing a READ FIFO using an embodiment of the present invention, if the processor core 110 is to consume a value from a memory-mapped hardware FIFO 100, it may simply read (fetch) a data structure from the memory exactly as it would from a cache memory. This action may have the effect of dequeuing the value at the head of the queue and returning it to the processor core 110. If the FIFO is empty, the processor core 110 may observe a condition similar to a "cache miss" and may respond like it would to any cache miss—generally, by stalling the processor core 110 or the requesting process or thread executing on the processor core 110 until the data is available. The essential semantics of a cache miss is that the data is not yet ready, and that is the case for an empty FIFO as well. The key difference is the cause of unavailability. In the case of a traditional cache miss, the data must be retrieved from higher in the memory hierarchy. In the case of a FIFO, the processor core 110 is waiting for another value to be enqueued. In the specific case of SPv2, the processor core stalls on a cache miss. Because such blocking behavior may be undesirable, the present invention may include alternative cache miss handling features (as described in detail below).

Variants of this typical READ behavior may have valuable use cases that require enhancements to the processor core 110 beyond typical cache interfaces such as, for example, and without limitation, a non-dequeuing read operation (often referred to as a PEEK operation) that does not modify the state of the FIFO. Another interface enhancement, also for example, and without limitation, is a non-blocking read operation that signals invalid data returned due to an empty FIFO, but that allows processing to continue. Building upon this idea is the ability to suspend a thread that is blocked on a FIFO rather than stalling the processor core 110 completely.

Figure 2:
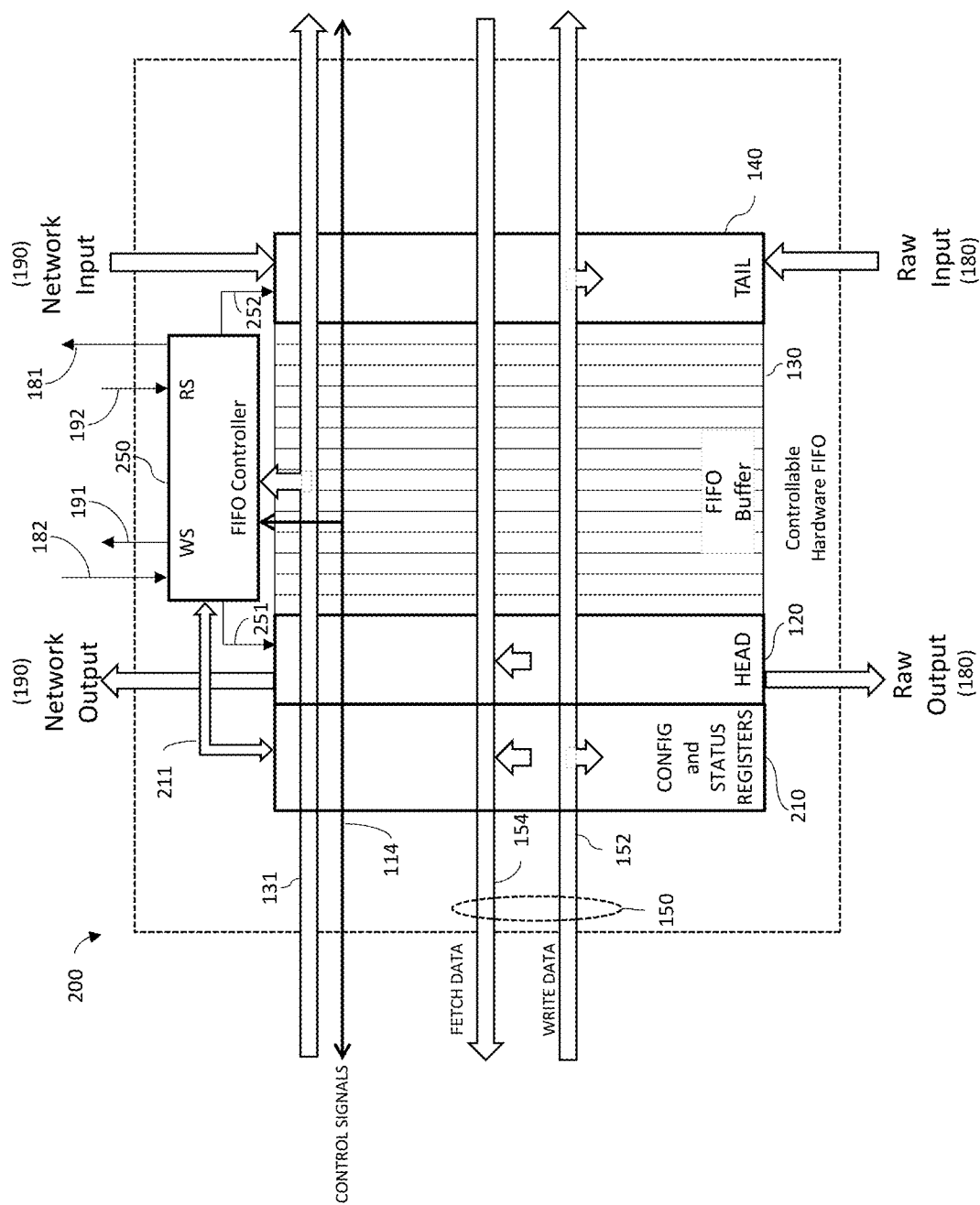
FIG. 2 a schematic block diagram of a memory-mapped hardware FIFO buffer further comprising a FIFO controller architecture according to an embodiment of the present invention.

Referring more specifically to FIG. 2, the controlled hardware FIFO 200 according to an embodiment of the present invention will now be discussed. The controlled hardware FIFO 200 may comprise most elements of a head 120, a tail 140, and a FIFO buffer 130, FIFO controller 250, and configuration and status registers 210 read from and written to by the FIFO controller 250 by means of bus 211, and control signals 251 and 252 to control reading from the head and writing to the tail, respectively. The hardware FIFO head 120 may be operably coupled with at least one of the data bus to fetch data 154, a raw output port 180, and a network output port 190. Similarly, the hardware FIFO 140 tail may be operably coupled with at least one the data bus to write data 152, a raw input port 180, and a network input port 190. An address decoding is performed by the FIFO controller 250. The hardware FIFO may be configured to support enqueuing and dequeuing operations either synchronously or asynchronously under control of the FIFO controller 250 through control signals 252 and 251, respectively. Said enqueuing operations from network 190 or raw inputs 180 are strobed by means of control signals 192 and 182 respectively, indicating valid data is available on the appropriate port. Similarly, said dequeuing operations to network or raw outputs are strobed by means of a control signal 191 and 181, respectively, indicating valid data is available on the appropriate port. The FIFO controller 250 is operably coupled with the configuration and status registers 210 by means of bus 211. Said registers 210 may be used to at least one of configure a state machine and microcontroller within the FIFO controller 250, provide scratch storage space to support FIFO controller 250 execution, hold FIFO controller 250 software, and indicate status back to the processor core 110. Configuration and status registers 210 may also be memory mapped into the processor address space to facilitate writing of configuration data and reading of status information by the processor core 110.

Figure 3:
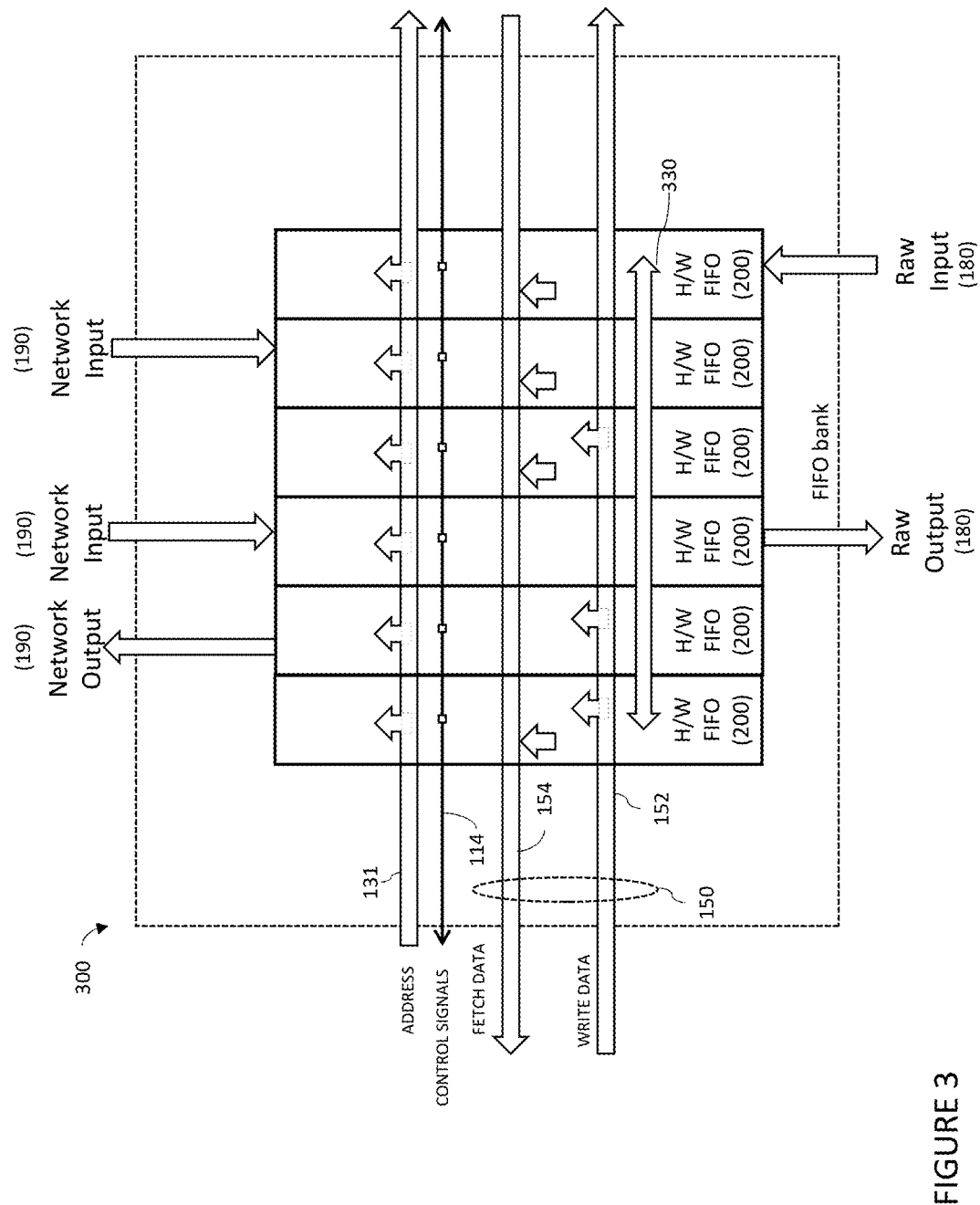
FIG. 3 a schematic block diagram of an exemplary FIFO bank comprising at least one hardware FIFO according to an embodiment of the present invention.

Referring more specifically to FIG. 3, the FIFO bank 300 according to an embodiment of the present invention will now be discussed. The FIFO bank 300 comprises at least one controlled hardware FIFO 200, address and data busses and control signals previously described for the controlled hardware FIFO, and a local bus 330. Said local bus 330 permits data movement among controlled hardware FIFOs without affecting the operation of the processor core 110, other FIFO banks, or other components sharing the address 131 and data 150 busses and control signals used by the FIFO bank 300.

Figure 4:
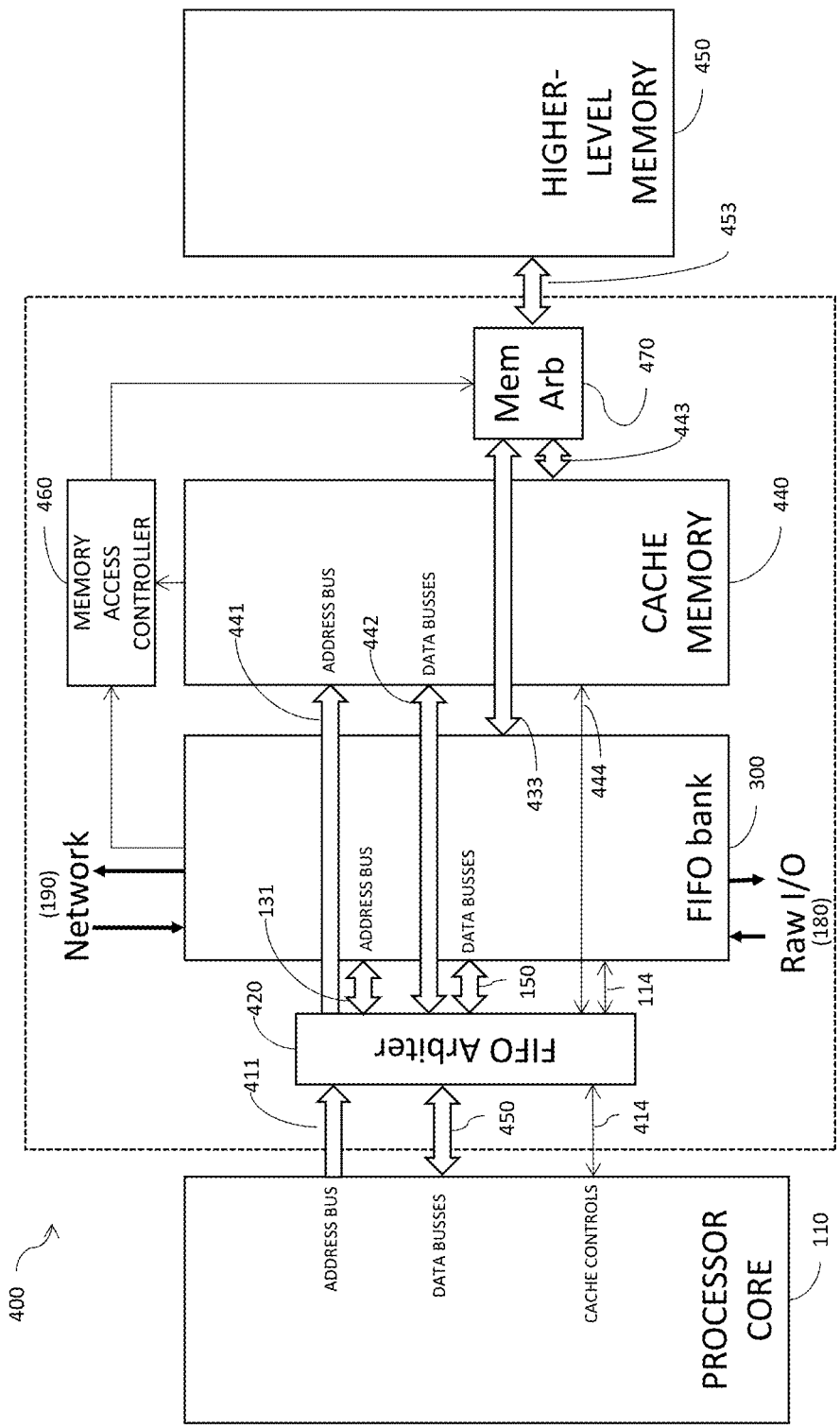
FIG. 4 is a schematic block diagram of an exemplary microprocessor computer system employing a processor core, an exemplary FIFO bank, cache memory, and a higher-level memory according to an embodiment of the present invention.

Referring more specifically to FIG. 4, the microprocessor computer system 400 employing a memory-mapped FIFO architecture according to an embodiment of the present invention will now be discussed. The system 400 may comprise a processor core 110 configured in data communication with a cache memory 440 and a higher-level memory 450, which typically represents memory higher in the memory hierarchy, by means of memory interface 453. Inserted into at least one data communication path between the processor core 110 and the cache memory 440 and/or the higher-level memory 450 may be one or more hardware FIFO banks 300 and a FIFO arbiter 420. Each of the FIFO bank 300 comprises one or more hardware FIFOs, each of which may handle incoming or outgoing data of various types, such as, for example, and without limitation, raw input/output (I/O) 180, network data 190, and/or other forms of inter-thread communication and inter-processor communication. The microprocessor computer system 400 may include one or more FIFO banks 300. Access to shared resources may require arbitration to mediate concurrent demands for said shared resources. Two such resources indicated, without limitation, are shared busses and signals to and from the processor core 110 and busses and signals to and from higher-level memory 450. A FIFO arbiter 420 may arbitrate communications to and from the processor core 110. The memory arbiter 470 may arbitrate communications to the memory 450 using a memory access controller 460 that detects contention for access to higher-level memory 450. The FIFO arbiter 420 may split the data buses 450 from the processor core 110 into separate address busses to the FIFO banks(s) 150 and the cache memory 442. Similarly, the FIFO arbiter 420 may split the address bus, 411 from the processor core 110 into separate address busses to the FIFO banks(s) 131 and the cache memory 441. Similarly, control signals may be combined and arbitrated by the FIFO controller 420; these include cache control signals 414, 114, and 444. If address busses, data busses, and control signals are suitable compatible and controlled to avoid contention, the corresponding logic of the FIFO controller 420 may simply wire the corresponding signals together. The memory arbiter 470 similarly arbitrates among the FIFO banks(s) 300 and cache memory 440 for access to memory 450 by means of memory interface 453 under control of the memory access controller 460. An additional embodiment of the present invention augments existing cache controls 414 with additional signals to enable additional FIFO operations. FIG. 4 depicts without limitation a FIFO bank 300 positioned in between the processor core 110 and its cache 440; those skilled in the art will appreciate that there are many alternative configurations for physically locating a FIFO bank 300 and the cache 440, including incorporation of a FIFO bank 300 into the cache 440.

In an embodiment of the present invention that does not require a FIFO arbiter 420, the processor core 110 may use the same busses 411 and 450 and control signals 414 to interact with the FIFO bank(s) 300 as it does for the cache memory 440.

Figure 5:
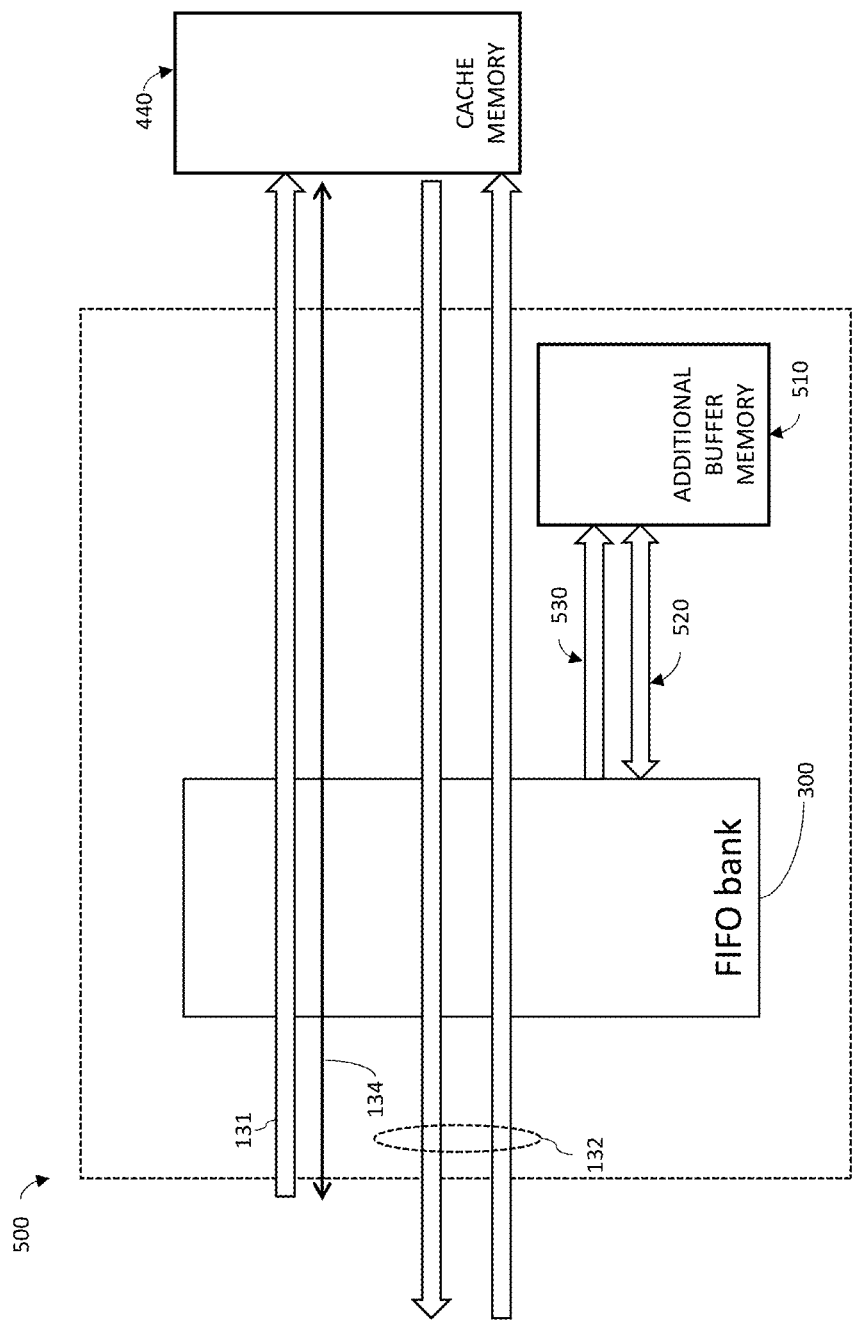
FIG. 5 is a schematic block diagram of an exemplary FIFO bank, cache memory, and additional buffer memory according to an embodiment of the present invention.

Referring more specifically to FIG. 5, and referring concurrently to FIG. 2 and FIG. 4, a split FIFO expansion of FIFO buffer capacity is discussed. One embodiment of the present invention, a FIFO bank 300 and at least one of an additional buffer memory 510 that may expand the FIFO buffer 130 capacity of the controlled hardware FIFOs 200 within the FIFO bank 300. In this embodiment, the additional buffer memory may expand the depth of the FIFO buffer 130 of at least one of the controlled hardware FIFO 200 within the FIFO bank 300. In yet another embodiment of the present invention, cache memory 440 or higher-level memory 450 may be used to expand the capacity of at least one of a controlled hardware FIFO. In both these embodiments, since components such as the processor core 110, network I/O 190, Raw I/O 180 and other FIFOs only interact with data on a controlled hardware FIFO through operations on its head and tail, the FIFO controller 250 of a controlled hardware FIFO 200 may expand and contract the capacity of its buffer without modifying its head or tail.

In one embodiment of the present invention comprising a controlled hardware FIFO and at least one of additional buffer storage 510, cache memory 440 and higher-level memory 450, data may be transferred from the FIFO buffer 130 to said storage as a single block more efficiently than with many individual transfer operations. Similarly, blocks may be transferred from said storage into a hardware FIFO with greater efficiency than individual transfer operations.

Figure 9:
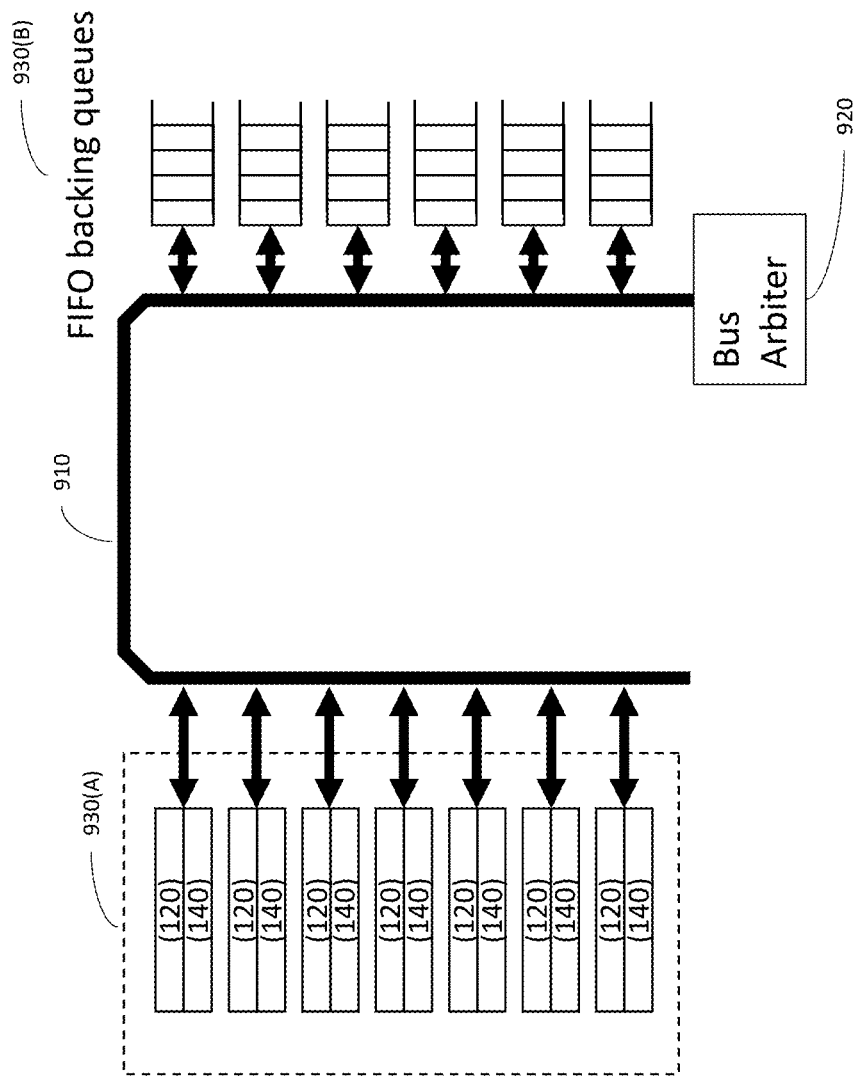
FIG. 9 is a schematic block diagram of an exemplary split FIFO comprising a FIFO bank and additional buffer memory connected by means of a bus according to an embodiment of the present invention.

Referring now to FIG. 9, an embodiment of a split FIFO is discussed. A split FIFO comprises a plurality 930(A) of FIFO heads 120 and tails 140, connected to their FIFO buffers 930(B) by means of a bus 910 arbitrated by a bus arbiter 920. The FIFO head 120 and tail 140 (i.e. "externals" because they are externally accessible) are fed from and feed, respectively, FIFO backing queues 930(B) while relegating additional associated FIFO backing values (i.e., "internals") to additional buffer memory 510, or cache 440, or higher-level memory 450. In such cases where the FIFO's buffer 930(A) and 930(B) are split, a data access bus 910 may be used to manage data traffic across the split. For example, and without limitation, access to the bus 910 may be arbitrated by a bus arbiter 920 to accommodate multiple FIFOs. Also for example, and without limitation, the FIFO bus interface may itself be a FIFO with the bus 910 synchronous to the processor core 110.

Figure 6:
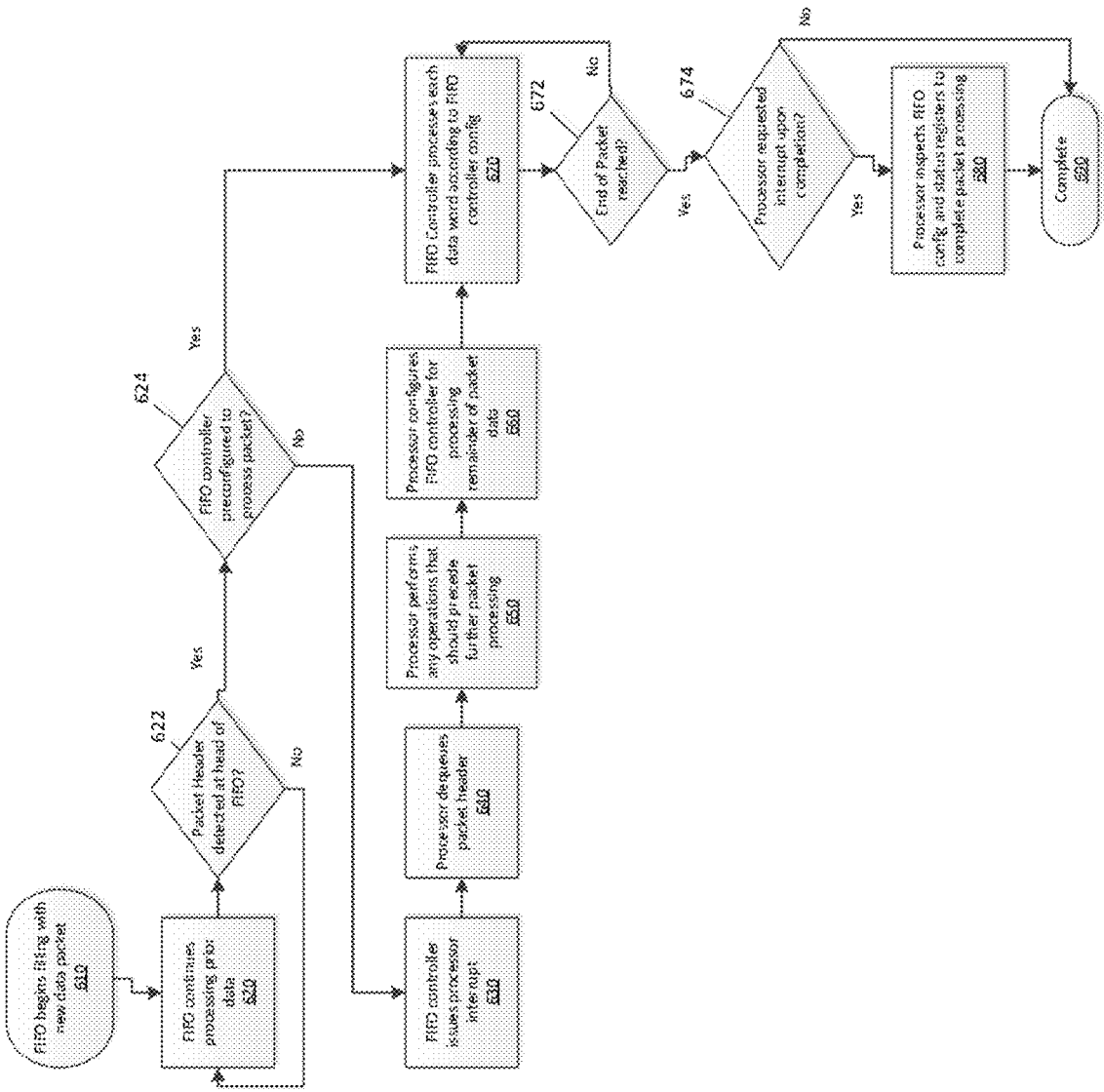
FIG. 6 is a flowchart of a method of employing a hardware FIFO to process an incoming data packet according to an embodiment of the present invention.

Referring to FIG. 6, and referring concurrently to FIG. 2, a means of configuring FIFO controller to process incoming data is discussed. One embodiment of the present invention comprises a means of a processor core 110 configuring and interacting with a controlled hardware FIFO 200 to processes packets or streams of incoming data, a stream being a potentially indeterminate amount of data. A new set of data (packet or stream) 610 starts entering a controlled hardware FIFO 200 at its tail 140. Such data is not processed until it reaches the head of the FIFO until previous data is dequeued 620. Once the head of a new set of data is detected 622, if the FIFO controller has not already been configured to process the new data, the FIFO controller 250 interrupts the processor core 110 (630). Eventually the processor core 110, may dequeue any amount of header data 640. Prior to handing off processing to the FIFO controller 250, the processor core 110 may perform other actions to ensure proper handing 650. For example and without limitation, the processor core may initialize a data structure in higher-level memory into which the processed data will be written. The processor core 110 may then configure the FIFO controller 250 by means of writing to its configuration registers 210. Whether pre-configured, or just configured, the FIFO controller 250 is now configured to process the incoming data. The FIFO controller 250 processes each data word 670. Such processing may continue indefinitely or until a termination condition is satisfied 672. For example, and without limitation, if the data is packetized, such processing may continue until the end of the packet is detected. If the processor core 110 requested an interrupt 674 upon completion, the FIFO controller 250 will then interrupt the processor core 110 (680). The processor core 110 may then inspect the FIFO controller 250 status registers 210 (690) and complete the current operation 695 and prepare for the next data to arrive.

Continuing to refer to FIG. 6, and referring concurrently to FIG. 2 and FIG. 4, an example said process of incoming data may include data movement under the control of the FIFO controller 250. Said controller may, without limitation, write data from its head to computable memory addresses to cache 440, higher-level memory 450 and other FIFOs. Once the FIFO controller is configured, it may perform its function independently, effectively performing a Direct Memory Access (DMA) operation. As the addresses are computed for each data word 670, the effect may be a non-unit-stride DMA. Exemplar patterns include, without limitation, a matrix cornerturn, a fast Fourier transform (FFT) butterfly, and a fanning out from one FIFO to many others.

Figure 7:
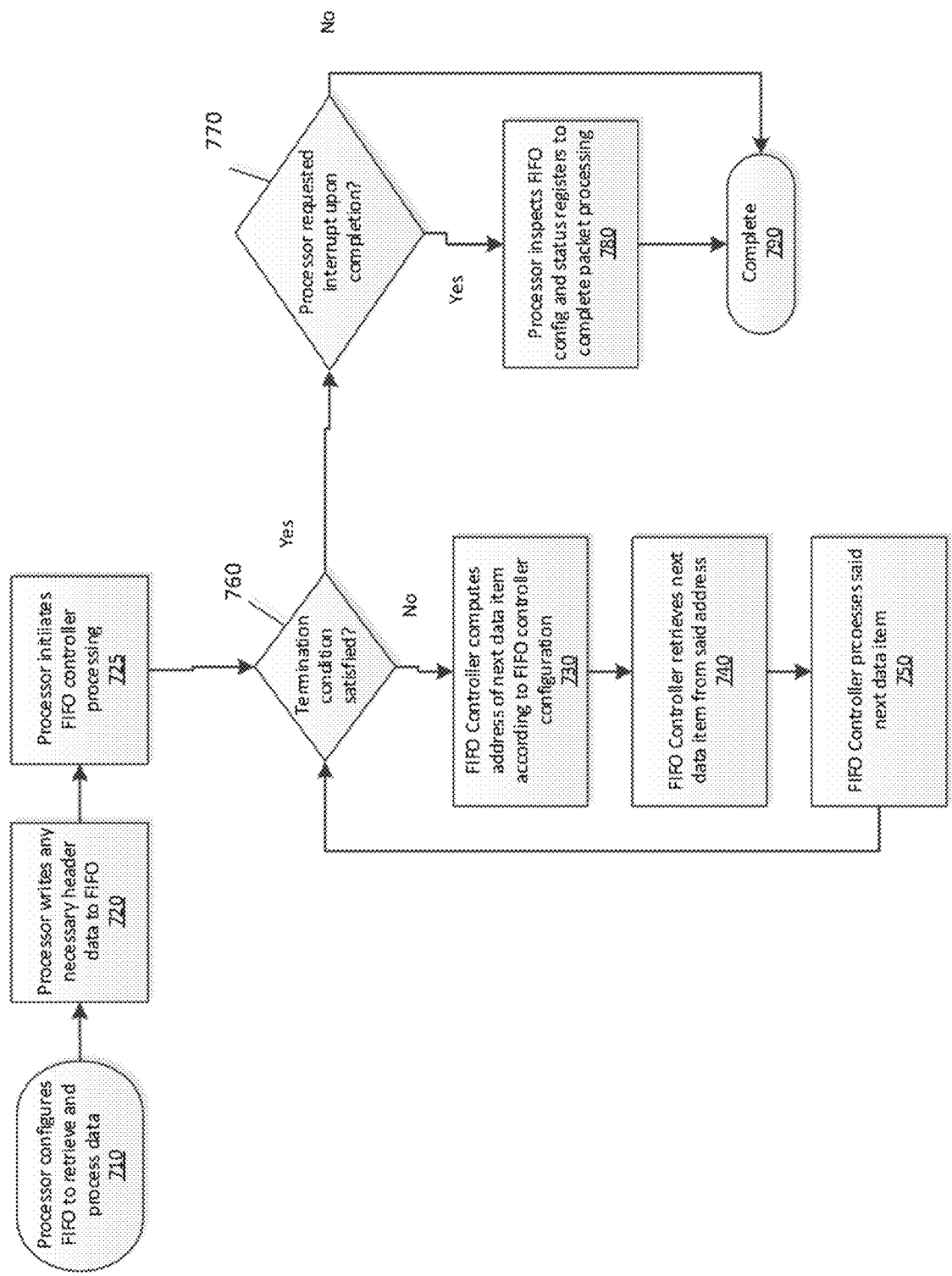
FIG. 7 is a flowchart of a method of employing a hardware FIFO to process an outgoing data packet according to an embodiment of the present invention.

Referring to FIG. 7, and referring concurrently to FIG. 2, a means of configuring FIFO controller to read and process data is discussed. One embodiment of the present invention, said processor core configures said FIFO controller 710 to retrieve and process data from at least one of cache memory, other memory, and other memory-mapped FIFO prior to initiating FIFO controller execution. Said processor core may write any required header data to said FIFO 720 prior initiating FIFO controller processing 725. Thereafter, said FIFO controller executes according to said configuration the following steps until FIFO controller satisfies termination condition specified 760 in said configuration: computing address of next data item according to said configuration 730 and retrieving next data item from said address 740 and processing said next data item according to said configuration 750. If said FIFO controller is configured to interrupt said processor core 770 at the completion of said processing, it interrupt said processor core 780, which inspects said FIFO configuration and status registers and completes processing 790.

Continuing to refer to FIG. 7, and referring concurrently to FIG. 2 and FIG. 4, an example said process of outgoing data may include data movement under the control of the FIFO controller 250. Said controller may, without limitation, read data from computable memory addresses from cache 440, higher-level memory 450 and other FIFOs and enqueue it at its tail. Once the FIFO controller is configured, it may perform its function independently, effectively performing a Direct Memory Access (DMA) operation. As the addresses are computed for each data word 730, the effect may be a non-unit-stride DMA. Exemplar address patterns include, without limitation, a matrix cornerturn, a fast Fourier transform (FFT) butterfly, and a fanning in from many FIFOs to one FIFO.

Figure 8:
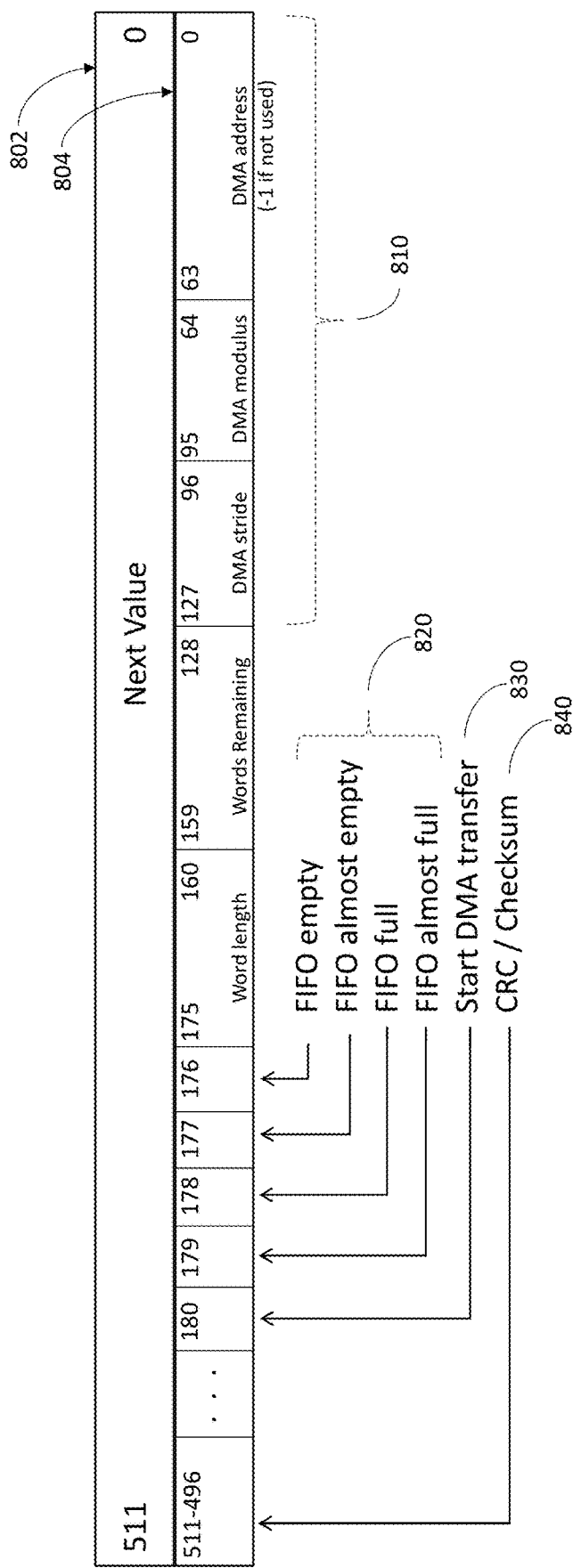
FIG. 8 an exemplary configuration register for a FIFO controller for controlling non-unit-stride Direct Memory Access data transfer and status reporting according to an embodiment of the present invention.

Referring to FIG. 8, and concurrently with FIG. 2 and FIG. 4, an exemplar FIFO "head of queue" and configuration register is shown. The following examples assume, without limitation, that the maximum width of the physical FIFO word is equal to the width of the processor core cache line (as illustrated, 512-bits, although this exemplary configuration is not limiting). As shown, adjacent 512-bit word may contain the next value 802 to be read from the FIFO and the control variables 804 to support DMA, respectively. The DMA may execute a simple state machine implemented as part of the FIFO controller 250 to move data into cache memory 440 or higher memory 450 without additional processor core 110 intervention aside from setting up the transfer. This set up operation may include processing frame headers (if any) and determining where the data should go. The data may be written in non-unit stride. In the illustrated example, the data word is fixed length for any given transfer and the length may be any value less than or equal to 512 (although powers of two are easiest to handle). Those skilled in the art will appreciate that this DMA register example is only illustrative and does not affect the scope of the invention that may include a plurality of registers for accomplishing a plurality of actions.

The potentially wide value word may require multiple accesses to process if it exceeds the width of the data bus 112. To facilitate this processing, both dequeuing and non-dequeuing read operations may be employed: one that "consumes" the value (and thus results in the next value in line coming to the queue head) and one that only "peeks" at some portion of the value (up to and including the full value). Employing said combinations of operations, an exemplar the processor core 110 may "walk" down the 512-bit wide data word 64-bits at a time performing non-dequeuing reads until it reaches the last 64-bit word. It then performs a dequeuing read and consumes the data at the head of the queue, which will have the effect of moving the next data value, if available, to the head of the FIFO. Similarly for a write operation, an exemplar the processor core 110 with a 64-bit data bus first performs a non-enqueuing write that writes the first 64 bits of data into the FIFO tail. As a non-enqueuing write, the written data cannot move towards the head of the FIFO. Subsequently, the processor core 110 may "walk" down the 512-bit wide data word 64-bits at a time performing non-enqueuing writes until it reaches the last value to be written. It then performs an enqueuing write that will release the 512-bit word to move towards the head of the FIFO. That word will now be unaffected by subsequent write operations on the hardware FIFO.

Applying the memory-mapped FIFO architectural constructs defined above, various embodiments of microprocessor computing systems employing those constructs will now be discussed.

Implementing Vector and Matrix Instructions

As a matter of definition, a vector processor (or array processor) is a central processing unit (CPU) that implements an instruction set containing instructions that operate on one-dimensional arrays of data called vectors and multi-dimensional arrays of data called matrices. A "stride" of an array (also referred to as increment, pitch or step size) may be defined as the number of locations in memory between beginnings of successive array elements. The SPv2 is a vector processor that has many vector-oriented instructions, such as vector dot product. Because vectors may be unit-stride (e.g., 8 bytes for a single-precision complex values) or non-unit-stride, the vector instructions have a parameter defining the stride (in bytes) between adjacent values. However, if a vector operation is operating upon data stored sequentially in a memory-mapped FIFO that has a single head address, addressing to a FIFO-oriented architecture may be accomplished by simply specifying a vector of stride zero. The result will be that the same address may be read over and over again (thus draining the memory-mapped FIFO) but each access will retrieve a subsequent value from the vector. Similarly, vector writes may fill a memory-mapped FIFO.

Similarly, matrices may be processed using an array of FIFOs, each holding a row or column of a matrix. To perform a matrix-vector product such as beamforming over a stream of incoming data, the processor core 110 may store the weights in internal registers and accumulate a dot product of these weights and each row of the matrix by dequeuing a value from the head of each FIFO in turn and adding the product of that value with the corresponding weight to the accumulated sum. This extension to this concept of vector instruction processing is particularly valuable when processing data in lock step from several input sources, such as a bank of analog-to-digital (A/D) converters from a radio frequency phased array presenting data as raw input data 180. Rather than relying on complex software synchronization and moving data blocks to memory before processing, a processor core 110 may be configured to read from a plurality of hardware FIFOs 100 in turn. Doing so may guarantee that all data that starts in synchronization remains in synchronization. If, perhaps due to network congestion, one input falls slightly behind, resulting in an empty FIFO, the processor core 110 may simply pause (block) until the data arrives and then may continue. If the addresses for the relevant memory-mapped FIFOs have a fixed stride, such a configuration may make it even easier to use existing fixed-stride vector instructions. Similar use cases may apply to WRITE FIFOs. Continuing the example above, if multiple beams are being formed by computing dot products on the input samples from the A/D converters, these synchronized beams may be sent out on WRITE FIFOs for subsequent processing either by the processor core 110 or by another servicing component. For operations that require a FIFO value to be used several times before moving to the next value, the processor core 110 may perform non-dequeuing reads until it is time to move to the next value at which point a dequeuing read is performed.

Note that because FIFOs implemented as described herein are memory-mapped, the processor core 110 may treat them just like any other memory location using efficient primitives like LOAD and STORE operations. Thus, memory-mapped FIFOs advantageously may be operable with existing compilers, using keywords like "volatile" in the C programming language, and assemblers without need for modification. Expensive operations (such as invoking the operating system and interrupt handling) may not generally be required to interact with the memory-mapped FIFOs.

Moving Data Efficiently to/from Memory

Referring to FIG. 4, and concurrently FIG. 2, a means for performing DMA operations is described. A person of skill in the art will immediately recognize the need, in appropriate computation scenarios, to efficiently store FIFO values into cache memory 440 and higher level memory 450. For example, and without limitation, one FIFO value storage approach may be to use a memory-move instruction (referred to as a vector copy) with a zero-stride input or output for writing to and reading from cache memory 440, respectively. While such a storage approach may work, the memory-move instruction may involve dedicating the processor core 110 to the task. Alternatively, certain embodiments of the present invention may include a means to perform Direct Memory Access (DMA) to move data into and out of a memory-mapped FIFO. DMA may effectively "automate" the reading/writing of data from/to cache memory 440 or higher level memory 450. A first step in implementing a DMA storage approach may include specifying by the processor core 110 writing to the FIFO controller 250 configuration registers 210 the address in cache memory 440 to use as a source or destination to hold the data going to or coming from the FIFO, respectively. For example, and without limitation, this address specification task may take the form either of the processor core 110 assigning an address for the next incoming/outgoing data, or of a hardware state machine computing the address. Another step in implementing the DMA storage approach may include enforcement of the buffer size limit to avoid buffer overflow. In these ways, the controlled hardware FIFO 200 may serve as a buffer between bursty processor demands and the desire for block-oriented memory transfer operation. In a modern computer architecture, these transfer operations may advantageously be used for high speed remote dynamic memory access (RDMA) across a network 190.

Referring to FIG. 4 and concurrently FIG. 2, in one embodiment of the present invention, a FIFO controller 250 may retrieve data from many locations spread throughout higher-level memory 450 and enqueue it at its tail 140 independently from the processor core in a sophisticated form of prefetch. A benefit of this approach is that potentially many page opening latency penalties may be masked, and but avoiding the cache, the cache is not forced to evict data. Similarly, a FIFO controller 250 may write to many locations in higher-level memory 450.

Chaining FIFOs and FIFO-Like Stream Processors

Continuing to refer to FIG. 4 and concurrently FIG. 2, as described above, a DMA implementation according to an embodiment of the present invention (see FIG. 1) may be directed to transfer of data between cache memory 440 and FIFO banks 300, but the controllable hardware FIFOs 200 may be memory mapped just like any other address. Therefore, a variant of DMA may forward data from one FIFO into another. Such a mechanism may advantageously support efficient store and forward patterns, and may be especially advantageous for off-loading incoming sensor data to alternative processors or chips.

In certain embodiments of the present invention, elements being chained need not actually be FIFOs, but instead need only implement the FIFO interface. For example, and without limitation, non-FIFO functional blocks that may implement a FIFO interface (e.g., enqueue and dequeue) may include integer-to-floating point converters (and reverse), TCP/IP offload engines, encryptors/decryptors, encoders/decoders, and checksum generators/checkers. Without programming, said functional blocks may stream process their inputs (sources) into outputs streamed to their outputs (sinks). In addition to forming a means to readily insert potentially significant hardware accelerators into an architecture, this embodiment of the present invention may allow such processing to be strung together; as long as the functional blocks implement FIFO interfaces, such elements may be chained by "forwarding" the head of one FIFO into the tail of another. By repeating this process, a chain of arbitrary length may be constructed. Unlike known techniques for chaining FIFOs together, chaining of memory-mapped FIFOs may implement data manipulations and may be addressed using the same techniques as transfers to memory.

Splitting FIFO Streams

Referring to FIG. 2, given the flexibility of FIFO data consumption, DMA, and processing described above, certain embodiments of the present invention may be configured to advantageously process a stream of data in more than one way; in essence, to split a FIFO stream (or frame) into two or more copies.

For example, and without limitation, splitting may be accomplished using a source FIFO head 120 and a plurality of consumers (FIFO tails 140), wherein the FIFO head controller forwards the data word at the head to each of the plurality of tail FIFOs before the word is dequeued. Also for example, and without limitation, splitting may be accomplished within a processing step whereby the processor core 110 (see FIG. 1) may consume incoming data, but as it consumes that data for its own purposes, it also forwards the data to another FIFO. This FIFO may be hard-coded in the processor core's 110 hardware or firmware, or the FIFO may be selected arbitrarily by the host processor core 110 as described above for DMA transfers.

Merging FIFO Streams

Referring to FIG. 2, certain embodiments of the present invention may be configured to advantageously process merging of two or more data streams into a single FIFO stream (or frame). That is, the inverse of splitting FIFO streams is merging FIFO streams. Two forms of merging are of particular interest in the context of memory-mapped FIFOs, and each has advantageous practical applications. The first is data-word-by-data-word consumption from a plurality of FIFOs. This consumption may be synchronous or asynchronous (Note: "synchronous" consumption need not be with respect to a "global" clock because FIFOs are often asynchronous devices; therefore, synchronization may be defined herein as respective to a local clock). After a word from each FIFO has been consumed, the outputs may be processed in any manner desirable. A generalization of this concept may be that such consumption need not be one-for-one. For example, and without limitation, to compute a scalar-vector product, a single word (representing a single-precision floating point number) may be consumed from one FIFO and then used to scale each value consumed from another FIFO. As such, data values may be consumed arbitrarily according to the logic of the consuming processor. One embodiment of the present invention may configure a merging FIFO to dequeue one value from each of a plurality of FIFO heads and process or enqueue them onto the merging FIFO's tail.

Another form of merging is at the "Frame" level. In this case, the processor may alternate in arbitrary order among a plurality of incoming FIFOs and may forward a plurality of data words from that FIFO before selecting the next FIFO. An example of frame-level merging is forwarding from multiple incoming network queues into a single TCP/IP offload engine. The data packets may be transferred in their entirety as a block/frame without insertion of other values.

FIFO Status

Referring now to FIG. 8, and continuing to refer to FIG. 2, in certain embodiments of the present invention, several elements of status that may be of practical value for the processor core 110 to read or write currently may not be accessible under the scheme described above. Simple status bits such as FIFO_EMPTY, FIFO_FULL, FIFO_ALMOST_EMPTY, and FIFO_ALMOST_FULL (see also 820 at FIG. 8) may be used to inform potential readers and writers of a hardware FIFO of the current state of said FIFO. Each of these, as well as other FIFO status indicators known in the art, may be used by the processor core 110 to handle exceptional conditions or to avoid stalling when the FIFO is empty or full. Additionally, as described above, certain embodiments of the present invention may associate data stored at a fixed address with the configuration 804 of said hardware FIFO 100, such that the addresses, stride (modulus), and length may define the parameters for DMA operations. Mapping this status and configuration data 210 into a readable and writable location may advantageously allow the processor core 110 to access these data. Given that the FIFO 200 may be mapped into the address space of the processor core 110, a natural, although not the only, implementation may be to use an adjacent memory address to access and manipulate said configuration and status data. Alternatively, dedicated registers defined for that purpose in the internal architecture of the processor core are anticipated, although such a solution may require extensive changes to the processor core and potentially to the instruction set.

Accommodating Differing Datum Sizes

Referring again to FIG. 1, a person of skill in the art will immediately recognize that data packets, and particularly those from raw I/O sources 180, may not match a word size or cache line size of one or more processor cores available within a computing system. For example, and without limitation, when manipulating data streaming from A/D converters, it is possible that 12-bit values may be of interest. The controllable hardware FIFO 200 may need to be able to accommodate differing datum sizes to offload data manipulation functions from the processor core 110. Employing the invention described herein, the FIFO configuration word may be a practical location to place this configuration information.

For example, and without limitation, one implementation may include a plurality of data elements concatenated on a single cache line. As data is read, according to the word size of the fetch instruction, the data may be shifted and masked as necessary to align the data by either the processor core 110 or the FIFO controller 250. Another embodiment may define a composite record (up to the size of the cache line) that may contain a plurality of sub-records. This processor core 110 may read the record and may deconstruct the sub-records in software or, alternatively, may parallel-load the sub-records into as many registers as appropriate. The semantics enforced may dictate that the record is not available until the entire set of bytes comprising the record is available. Such an implementation may require that the sender and receivers agree on the datum length a priori. One implementation option may be that data is framed and that the frame header indicates the datum length for the data within it. Similar mechanisms may be used on both enqueuing and dequeuing.

Cache Line "Pinning"

Referring to FIG. 4 and concurrently to FIG. 2, a means to implement a hardware FIFO 100 as part of a cache is discussed. An embodiment of the present invention wherein memory-mapped FIFOs 100 are managed within the cache memory 440 that maximizes reuse of an existing cache controller is now described in more detail. For example, and without limitation, in a typical memory cache configuration known in the art, data from a small set of memory locations (typically addressed by their location in higher-level memory 450 but placed according to the cache architecture) may be replicated in the cache memory 440. That data may be brought in and evicted as needed, and several schemes exist for choosing how physical addresses are mapped to cache locations and which cache lines are evicted. In this embodiment of the present invention, the addresses of the FIFOs 100 may be mapped into, and managed by the cache. However, because hardware FIFOs 100 represent physical structures and not just data, they may not be "evicted" from the cache memory 440. Effectively, memory-mapped FIFOs act as if they are pinned in the cache memory 440 permanently. For example, and without limitation, cache pinning may be implemented as a 5-way set associative cache where one "way" may be dedicated to the FIFO banks 330. In practice, as indicated in FIG. 4, such FIFO banks 300 may sit alongside of the cache memory 440 rather than inside it.

As described above, various embodiments of the present invention exemplify how a small state machine may convert a simple FIFO mechanism into a powerful tool to map data into memory and/or forward data across a distributed computing architecture. In addition, if an FPGA or small microprocessor or microcontroller is added to the FIFO control design, additional functions such as data-dependent processing and routing and format translation may be performed on the fly that may be valuable for various applications. For example, and without limitation, converting 16-bit integer data into IEEE single-precision floating point representation, and dropping or capping outlier data, multi-step parallel sorting algorithms may be implemented where FIFOs represent bins in a multi-step sort, and moving averages may be computed.

Referring again to FIG. 2, the concept of adding an FPGA or other programmable device to the FIFO controller 250 of present invention may open the potential for either a static configuration or runtime modification of FIFO controller logic. Run time configuration may be accomplished by at least one mechanism for a processor core to load a program/configuration into the programmable device. In an embodiment of the present invention using an FPGA, such configuration data may include the configuration of the FPGA logic or said logic may be configured statically. Potential mechanisms include having the controller's program storage memory-mapped into the address space of the processor core 110, having a port through which the processor core 110 pushes the program, and having external signals that permit the FIFO controller 250 programs to be executable independently of the processor core 110.

Because of the ease of operating the FIFO interfaces using simple processor instructions (e.g., LOAD and STORE), much of the complexity commonly associated with messaging may be avoided, thus facilitating very low latency processing that may be advantageous to time-sensitive applications such as financial trading. For example, and without limitation, a processor core with a writable micro-store may be able to process entire messages with a single compound instruction. To continue the example of financial decisions, complex event processing may execute without interruption and without fetching instructions from memory.

While one advantageous use of the invention may be for handling high data rate computation and microprocessor computer systems, the FIFO abstraction and the mapping into simple processor instructions may allow low-power processors to more efficiently handle incoming and outgoing data, which may be particularly appropriate and advantageous for internet-of-things (IoT) devices.

Multiprocessor Systems

Referring to FIG. 4 and concurrently FIG. 6, a multiprocessor system employing hardware FIFOs is described. Multiprocessor systems, especially those comprising multiple processing cores 110 on a processor die, require high-speed communications. Such systems, may employ crossbar networks or other network topologies that present processor cores 110 with a plurality of incoming and outgoing network ports 190. Such architectures advantageously may employ memory-mapped controllable FIFOs 200 to efficiently create, consume, and transmit high speed packet data (FIG. 6), while minimizing load on the processor cores. Likewise, high-speed multi-processor system communications means such as Remote Direct Memory Access (RDMA) may advantageously employ memory mapped FIFOs. One embodiment of the present invention is a multicomputer system comprising a plurality of computational nodes connected to a communications network through memory-mapped controllable FIFOs 200. A further embodiment of the present invention further comprises fixed functionality computational blocks that at least one of consumes data from at least one memory-mapped hardware FIFO and produces data that is enqueued on a memory-mapped hardware FIFO.

Some of the illustrative aspects of the present invention may be advantageous in solving the problems herein described and other problems not discussed which are discoverable by a skilled artisan.

While the above description contains much specificity, these should not be construed as limitations on the scope of any embodiment, but as exemplifications of the presented embodiments thereof. Many other ramifications and variations are possible within the teachings of the various embodiments. While the invention has been described with reference to exemplary embodiments, it will be understood by those skilled in the art that various changes may be made and equivalents may be substituted for elements thereof without departing from the scope of the invention. In addition, many modifications may be made to adapt a particular situation or material to the teachings of the invention without departing from the essential scope thereof. Therefore, it is intended that the invention not be limited to the particular embodiment disclosed as the best or only mode contemplated for carrying out this invention, but that the invention will include all embodiments falling within the scope of the appended claims. Also, in the drawings and the description, there have been disclosed exemplary embodiments of the invention and, although specific terms may have been employed, they are unless otherwise stated used in a generic and descriptive sense only and not for purposes of limitation, the scope of the invention therefore not being so limited. Moreover, the use of the terms first, second, etc. do not denote any order or importance, but rather the terms first, second, etc. are used to distinguish one element from another. Furthermore, the use of the terms a, an, etc. do not denote a limitation of quantity, but rather denote the presence of at least one of the referenced item.

Thus the scope of the invention should be determined by the appended claims and their legal equivalents, and not by the examples given.

That which is claimed is:

1. A microprocessor computer system comprising:
   a processor core capable of at least one of
      reading data from a separate storage means by presenting an address and retrieving data; and
      writing data to a separate storage means by presenting an address and data to be stored by said storage means;
   a storage means comprising at least one bank of at least one hardware first in first out (FIFO), said hardware FIFO further comprising a head, a tail, and a buffer comprising any number of additional buffer locations to hold data enqueued in the FIFO:
      wherein at least one of said FIFO head and FIFO tail is addressable by said processor core and mapped to at least one fixed memory address; and
      busses and control signals to operably couple said processor core and said hardware FIFO, wherein said busses transfer addresses and data between said processor core and said hardware FIFO, and said control signals indicate failed attempts to write to said hardware FIFO when it is full and failed attempts to read from said hardware FIFO when it is empty;
   a microprocessor computer system further comprising a controllable FIFO,
      wherein said controllable FIFO further comprises a FIFO controller, and
      wherein said FIFO controller further comprises at least one of a state machine and a programmable microcontroller that is configured to control operations on said hardware FIFO;
      wherein said microprocessor computer system further comprising a FIFO bank;
   a memory hierarchy comprising at least one cache memory and at least one higher-level memory within a memory hierarchy above said cache memory wherein said cache memory operably couples said processor core to said higher-level memory;
      wherein said control signals further indicate to said processor core that said processor core's requested read operation has resulted in a cache miss such that the requested data is not immediately available; and
      wherein said control signals further indicate to said processor core that said processor core's requested write operation cannot immediately be executed.

2. The microprocessor computer system according to claim 1 further comprising at least one arbiter that mediates contention for bus and signal resources shared by at least two of said processor core, said hardware FIFO, said cache memory, and said higher-level memory.

3. The microprocessor computer system according to claim 2 wherein said processor core includes caches through which said processor core accesses said at least one of said hardware FIFO.

4. The microprocessor computer system according to claim 3 wherein said read operation on said FIFO head comprises at least one of a blocking dequeueing read, a blocking non-dequeuing read, a non-blocking dequeueing read, and a non-blocking non-dequeuing read.

5. The microprocessor computer system according to claim 4 wherein said processor core indicates the type of said read operation to be performed by mapping a different address to said FIFO head for each type of said read operation.

6. The microprocessor computer system according to claim 5 wherein said write operation on said FIFO tail comprises at least one of a blocking enqueueing write, a non-blocking enqueueing write, and a non-blocking non-enqueueing write.

7. The microprocessor computer system according to claim 6 wherein said processor core indicates the type of said write operation to be performed by mapping a different address to said FIFO tail for each type of said write operation.

8. The microprocessor computer system according to claim 7, wherein attempts by said processor core to perform an enqueuing write on a full FIFO are treated like a cache miss that stalls an invoking processor core thread until capacity is available; and
attempts by said processor core to perform a dequeuing read on an empty FIFO are treated like a cache miss that stalls an invoking processor core thread until data is available.

9. The microprocessor computer system according to claim 8 wherein a write operation to said buffer comprises a block-oriented data transfer.

10. The microprocessor computer system according to claim 9 wherein a read operation from said buffer comprises a block-oriented data retrieval operation.

11. The microprocessor computer system according to claim 10 wherein said FIFO controller further comprises an auxiliary processor configured by said processor core to control at least one of:
manipulation of data enqueued in said hardware FIFO;
transfers of data into said hardware FIFO from at least one of cache memory, other memory, external networks, raw data inputs, and other hardware FIFOs; and
transfers of data from said hardware FIFO to at least one of cache memory, other memory, external networks, raw data inputs, and other hardware FIFOs.

12. The microprocessor computer system according to claim 11 wherein said auxiliary processor is of a processor type selected from the group consisting of a field-programmable gate array (FPGA), a microprocessor, and a microcontroller.

13. The microprocessor computer system according to claim 12 wherein addresses for at least one of transfers to cache, memory and other FIFOS, and transfers from cache, memory, and other FIFOs use addresses computed by said FIFO controller.

14. The microprocessor computer system according to claim 13 further comprising at least one other hardware FIFOs
wherein said FIFO controller of said controllable FIFO is further configured to at least one of:
write data from said controllable FIFO's head to at least one of said other FIFO's tail, and
read data from at least one of said other FIFO's head to said controllable FIFO's tail.

15. The microprocessor system according to claim 14 wherein at least one of said memory-mapped FIFO head and tail is pinned at a logical buffer address managed by the cache memory.

16. The microprocessor computer system according to claim 15 further comprising:
at least one additional buffer that is located apart from said hardware FIFO and that uses an alternate memory to expand the capacity of said hardware FIFO, and
busses and signals to transfer data between said hardware FIFO and said additional buffer.

17. The microprocessor computer system according to claim 16 wherein said FIFO controller adjusts the size of said additional buffer.

18. The microprocessor computer system according to claim 17 further comprising:

at least one additional processor core; and
a data communications network;
wherein said at least one additional processor core exchanges data over said data communications network with said processor core by means of said hardware FIFOs.

19. The microprocessor computer system according to claim 18 wherein said at least one additional processor core comprises a fixed functionality computational block.

20. The microprocessor computer system according to claim 19, wherein said fixed functionality computational block consumes data from at least one memory-mapped hardware FIFO and produces data that is enqueued on at least one memory-mapped hardware FIFO.

21. The microprocessor computer system according to claim 20 wherein said FIFO buffer further comprises a functional block that processes data as it moves from said FIFO tail towards said FIFO head.

22. A method of configuring a microprocessor computer system, wherein said microprocessor computer system comprises a processor core capable of at least one of reading data from a storage means by presenting a memory address and retrieving data and writing data to a storage means by presenting a memory address and data to be stored by said storage means;
a storage means comprising at least one bank of at least one hardware first in first out hardware FIFO, said hardware FIFO comprising a head, a tail, and a buffer comprising any number of additional buffer locations to hold data enqueued in said hardware FIFO, wherein at least one of said hardware FIFO head and hardware FIFO tail is addressable by said processor core and mapped to at least one fixed said memory address;
busses and control signals to operably couple said processor core and said hardware FIFO wherein said busses transfer addresses and data between said processor core and said hardware FIFO; and
control signals for indicating failed attempts to write to said hardware FIFO when it is full and failed attempts to read from said hardware FIFO when it is empty;
a FIFO controller comprising at least one of a state machine and a programmable microcontroller that is configured to control operations on said hardware FIFO and a set of configuration and status registers; and
a new data packet configuration comprising a header of any length and data of any length;
wherein said method comprises the steps of:
filling with new data packet at said tail and advancing towards said head of said hardware FIFO as prior data packets are dequeued;
detecting said new data packet header at said head of said hardware FIFO;
determining if said FIFO controller has already been configured to process said new data packet;
when said FIFO controller has not been configured to process said new data packet header,
sending from said FIFO controller to said processor core an interrupt; and
wherein said processor core:
dequeues and processes said new data packet's header;
performs any operations that precede packet data processing; and
configures said FIFO controller for processing a remainder of said new data packet;
processing by said configured FIFO controller of said new data packet according to said configuration until, and in accordance with a FIFO controller configuration, a termination condition is satisfied;

when said FIFO controller is configured to interrupt said processor core at a completion of said processing:
  interrupting said processor core; and
    whereupon said processor core inspects said FIFO configuration and status registers and completes processing of said new data packet.

23. The method according to claim 22 wherein said processing of said new packet data comprises a direct memory access (DMA) operation that writes data to at least one of cache memory, other memory, and at least one other FIFO.

24. A method of configuring a microprocessor computer system that comprises
  a processor core capable of at least one of
    reading data from a storage means by presenting an address; and
    retrieving data and writing data to a storage means by presenting an address and data to be stored by said storage means;
  said storage means comprising at least one bank of at least one hardware first in first out (FIFO) queue, denoted hardware FIFO, comprising a head, a tail, and a buffer comprising any number of additional buffer locations to hold data enqueued in the FIFO wherein at least one of said FIFO head and FIFO tail is addressable by said processor core and mapped to at least one fixed memory address;
  busses and control signals to operably couple said processor core and said hardware FIFO wherein said busses transfer addresses and data between said processor core and
  said hardware FIFO, and said control signals indicate failed attempts to write to said hardware FIFO when it is full and failed attempts to read from said hardware FIFO when it is empty;
  a FIFO controller comprising at least one of a state machine and a programmable microcontroller that is configured to control operations on said hardware FIFO and a set of configuration and status registers;
  wherein said method comprising the steps of:
    configuring by said processor core, said FIFO controller to retrieve and process data from at least one of cache memory, other memory, as at least one of memory-mapped FIFO;
    writing by said processor core, any required header data to said FIFO prior initiating FIFO controller processing;
    initiating by said processor core, FIFO controller processing using said configuration, the following steps until FIFO controller satisfies termination condition specified in said configuration:
      computing an address of a next data item according to said configuration;
      retrieving said next data item from said address and processing said next data item according to said configuration; and
    when said FIFO controller is configured to interrupt said processor core at the completion of said processing, interrupting said processor core, whereupon said processor core inspects said FIFO configuration and status registers and completes processing.

25. The method according to claim 24 wherein said steps of computing address, retrieving next data item, and processing next data item collectively perform a direct memory access (DMA) operation that reads data from at least one of cache memory, other memory, and at least one of another FIFO.

26. The method according to claim 25 wherein said DMA operation collects data as a pre-fetch for subsequent processing.

27. A method of configuring a microprocessor computer system, wherein said microprocessor computer system comprises
  a processor core capable of at least one
    of reading data from a storage means by presenting an address and retrieving data; and
    writing data to a storage means by presenting an address and data to be stored by said storage means;
  a storage means comprising at least one bank of at least one hardware first in first out (FIFO) queue comprising a head, a tail, and a buffer comprising any number of additional buffer locations to hold data enqueued in said hardware FIFO wherein at least one of said hardware FIFO head and said hardware FIFO tail is addressable by said processor core and mapped to at least one fixed memory address;
  busses and control signals to operably couple said processor core and said hardware FIFO wherein said busses transfer addresses and data between said processor core and said hardware FIFO, and said control signals indicate failed attempts to write to said hardware FIFO when it is full and failed attempts to read from said hardware FIFO when it is empty; and
  when a bit width of said hardware FIFO tail exceeds a bit width of said processor core's ability to write to said hardware FIFO tail in a single write operation, said method comprises the steps of
  performing a sequence of non-enqueuing write operations until an occurrence of a last word to be written; and
  performing an enqueuing write for the last write operation that commits said word to said hardware FIFO.

28. A method of configuring a microprocessor computer system, wherein said microprocessor computer system comprises:
  a processor core capable of at least one of
    reading data from a storage means by presenting an address; and
    retrieving data and writing data to a storage means by presenting an address and data to be stored by said storage means,
  said storage means comprising at least one bank of at least one hardware first in first out (FIFO) queue, denoted hardware FIFO, comprising a head, a tail, and a buffer comprising any number of additional buffer locations to hold data enqueued in the FIFO wherein at least one of said FIFO head and FIFO tail is addressable by the processor core and mapped to at least one fixed memory address,
  busses and control signals to operably couple said processor core and said hardware FIFO wherein said busses transfer addresses and data between said processor core and said hardware FIFO, and said control signals indicate failed attempts to write to said hardware FIFO when it is full and failed attempts to read from said hardware FIFO when it is empty,
  wherein when bit width of said FIFO head exceeds bit width of said processor core's ability to read from said FIFO head in a single read operation, said method comprises performing a sequence of non-dequeuing read operations until an occurrence of a last word to be read; and
performing a dequeuing read for said last read operation that removes said word from said hardware FIFO.

* * * * *